(12) United States Patent
de Geer et al.

(10) Patent No.: US 8,757,478 B2
(45) Date of Patent: Jun. 24, 2014

(54) METHOD FOR HUB AND SPOKES PAN ENTRY AND PAYMENT VERIFICATION

(75) Inventors: Jacob de Geer, Stockholm (SE); Magnus Nilsson, Djursholm (SE)

(73) Assignee: iZettle Merchant Services AB, Stockholm (SE)

( * ) Notice: Subject to any disclaimer, the term of this patent is extended or adjusted under 35 U.S.C. 154(b) by 0 days.

(21) Appl. No.: 13/544,268

(22) Filed: Jul. 9, 2012

(65) Prior Publication Data

US 2014/0008434 A1 Jan. 9, 2014

(51) Int. Cl.
| G06F 17/00 | (2006.01) |
| G06Q 40/00 | (2012.01) |
| G07F 7/12 | (2006.01) |
| G07F 7/08 | (2006.01) |
| G06Q 30/06 | (2012.01) |
| G06K 5/00 | (2006.01) |

(52) U.S. Cl.
CPC *G07F 7/12* (2013.01); *G07F 7/122* (2013.01); *G07F 7/125* (2013.01); *G07F 7/127* (2013.01); *G07F 7/08* (2013.01); *G06Q 30/0601* (2013.01); *G06Q 30/06* (2013.01); *G06Q 30/0609* (2013.01)
USPC .............................. 235/375; 235/380; 705/44

(58) Field of Classification Search
CPC ........... G07F 7/12; G07F 7/122; G07F 7/125; G07F 7/127; G07F 7/1016; G07F 7/08; G06Q 20/40; G06Q 30/06; G06Q 30/0609
USPC .............. 235/380; 705/26.1, 26.35, 26.82, 35, 705/39, 44, 71
See application file for complete search history.

(56) References Cited

U.S. PATENT DOCUMENTS

| 5,727,163 A * | 3/1998 | Bezos ............................ 705/50 |
| 2002/0029342 A1 | 3/2002 | Keech |
| 2007/0089168 A1* | 4/2007 | Wang et al. ........................ 726/9 |
| 2010/0017334 A1 | 1/2010 | Itoi et al. |
| 2010/0057616 A1 | 3/2010 | Kapur et al. |
| 2010/0057620 A1* | 3/2010 | Li et al. ............................ 705/71 |
| 2010/0125737 A1* | 5/2010 | Kang .............................. 713/176 |
| 2012/0072346 A1 | 3/2012 | Barkan Daynovsky et al. |

FOREIGN PATENT DOCUMENTS

WO 2012/073014 A1 6/2012

OTHER PUBLICATIONS

International Search Report, corresponding to PCT/EP2012/063430, mailed Apr. 2, 2013.
Written Opinion of the International Searching Authority, corresponding to PCT/EP2012/063430, mailed Apr. 2, 2013.

* cited by examiner

*Primary Examiner* — Christle I Marshall
*Assistant Examiner* — Claude J Brown
(74) *Attorney, Agent, or Firm* — Renner, Otto, Boisselle & Sklar, LLP

(57) ABSTRACT

A method of conducting an electronic card payment between a merchant, having a merchant's device, and a cardholder, having a payment card and a cardholder's device. The method include entering payment card information associated with the payment card comprising at least a first part of a personal account number (PAN), and purchase information in the merchant's device, entering a second part of the PAN in the card holder's device and submitting the second part of the PAN to a payment server, transmitting the purchase information and payment card information to the payment server, where the PANs are concatenated to a complete PAN, and transmitting the purchase information and an updated payment card information with the complete PAN to a bank server conducting the card payment.

8 Claims, 2 Drawing Sheets

METHOD FOR HUB AND SPOKES PAN ENTRY AND PAYMENT VERIFICATION

TECHNICAL FIELD

The invention relates in general to the field of electronic credit transactions, and more particularly, to a method and a system for credit card payment using a credit card.

BACKGROUND

Every day an incredible number of credit card payments are made around the world, and the number of payments are steadily increasing.

EMV is the leading payment system specification for credit cards on the market and was jointly developed by the companies Europay International, Mastercard International, and Visa International, hence the abbreviation EMV. To be able to develop a credit card payment system that is capable of using standard EMV-approved credit cards, it is essential that the payment system fulfills the EMV specification.

The majority of credit card payments are still made in stores using bulky and stationary EMV-approved point-of-sale (POS) terminals. However, in the last couple of years the interest, both from the public and from companies, of being able to make payments with portable hand-held devices such as mobile phones have grown rapidly. However, the mobile phone alone is not considered to be a secure device and does not fulfill the requirements for conducting a secure EMV-approved payment.

It has been shown that a credit card payment can be made secure and EMV-approved using a specialized card reader device that can be attached to an unsecure mobile phone in the manner presented in the International patent application with the application number PCT/EP2010/066186 by the iZettle company. However, the method presented in PCT/EP2010/066186 relies on that the cardholder has a payment card with an integrated EMV-approved chip which can be read by the card reader device, which today is not always the case. There are instances when the payment card can't be read in a card reader, for instance when the payment card only has a magnetic strip, if the chip has been damaged or if a card reader device is missing.

Thus, finding a way to be able to make secure and EMV-approved electronic credit card payments using an ordinary unsecure mobile phone without any secure card reader device also without using a payment card with a microchip is therefore highly sought after.

SUMMARY OF THE INVENTION

With the above description in mind, then, an aspect of the present invention is to provide a way to make secure and EMV-approved electronic credit card payments without using a secure card reader device which seek to mitigate, alleviate, or eliminate one or more of the above-identified deficiencies in the art and disadvantages singly or in any combination with a sustained level of payment security.

A first aspect of the present invention relates to a method of conducting an electronic card payment between a merchant, having a merchant's device, and a cardholder, having a payment card and a cardholder's device, characterized in that it comprises entering payment card information associated with said payment card, comprising at least a first part of a personal account number (PAN), and purchase information in the merchant's device and transmitting said purchase information and payment card information to a payment server, entering a second part of said PAN in said card holder's device, and submitting said second part of said PAN to said payment server, concatenating said first and second parts of said PAN to a complete PAN in a payment server, and transmitting said purchase information and an updated payment card information comprising at least said complete PAN to a bank server conducting said card payment.

By splitting up the PAN into at least two sequences an improved level of security is achieved in comparison to allowing the merchant to enter the complete PAN. In this way the cardholder always have to be an active part of the payment sessions which dramatically improves the security of the payment session.

The method may further comprise that in said payment server retrieving, from previously stored payment card information, at least one contact information associated with said received payment card information, and transmitting a request for PAN message to said cardholder's device (103), using said contact information.

The invention further relates to a method wherein said request for PAN message may contain a web address of a secure web page on said payment server (105) and wherein the step of submitting the second part of said PAN may comprise submitting said second part of said PAN via said web page.

The method further comprises the combination of using a user signature in the merchant's device and PAN input using the cardholder's device, will increase the security further, because this solution requires proximity (i.e. being in the same physical location) between the merchant's device and the cardholder's device since the cardholder is required to enter the second part of the PAN in the cardholder's device and sign the receipt message in the merchant's device.

The invention further relates to a method wherein the contact information may be at least one phone number or one email address.

The method may further comprise transmitting said at least one contact information associated with said payment card to said merchant's device, and selecting in said merchant's device a contact information to use for communication with said cardholder's device and transmitting information about said selection to said payment server, and wherein said request for PAN message is transmitted to said cardholder's device, using said selected contact information.

The method may further comprise transmitting a receipt message and a signature request from said payment server to said merchant's device, and signing said receipt message and transmitting said signed receipt message to said payment server.

The method may further comprise starting a time-limited payment session in the payment server when said purchase information and payment card information is received from said merchant's device.

A second aspect of the present invention relates to a system for conducting an electronic card payment between a merchant and a cardholder, the system comprising a merchant's device, a cardholder's device and a payment server characterized in that said merchant's device, cardholder's device and payment server, are adapted to perform the steps described in the first aspect of the present invention related to a method for conducting an electronic card payment between a merchant and a cardholder as described above.

BRIEF DESCRIPTION OF THE DRAWINGS

Further objects, features, and advantages of the present invention will appear from the following detailed description of some embodiments of the invention, wherein some embodiments of the invention will be described in more detail with reference to the accompanying drawings, in which.

DETAILED DESCRIPTION

Embodiments of the present invention, and variants thereof, will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Embodiments of the present invention will be exemplified using a mobile communication device such as a mobile phone. However, it should be appreciated that the invention is as such equally applicable to electronic devices in general which have wired- and/or wireless communication capabilities. Examples of such devices may for instance be any type of mobile phone, laptop (such as standard, ultra portables, net-books, and micro-laptops), handheld computer, portable digital assistant, tablet computer, gaming device, accessory to mobile phones, etc. However, for the sake of clarity and simplicity, the embodiments outlined in this specification are exemplified with, and related to, mobile phones only.

Embodiments of the present invention will be exemplified using a credit card. However, it should be appreciated that the invention is as such equally applicable to any type of payment cards having an embossed bank card number along the lines of the ISO/IEC 7812 numbering standard. Examples of such devices may for instance be any type of debit card, charge card, fleet card, store-value card, or gift card.

Today, credit card payments are commonly authorized by entering a personal identification number (PIN) that is either verified on-line with the issuing bank, also known as an on-line verification, or against the information stored in a secure microchip on the credit card, also known as an off-line verification. A credit card payment may also be authorized by the cardholder's hand-written signature. In that case the magnetic stripe of the credit card is read by a secure payment device, the cardholder notifies the merchant that he or she does not have a PIN code for the payment card after which the merchant hands over a paper slip to the cardholder and requesting the cardholder to sign it with his or her signature.

All above described methods for authorizing a credit card payment are EMV-approved methods for carrying out a credit card payment where the sensitive card information is either stored in a secure chip, in a magnetic stripe or simply entered into a secure payment device. In contrast the present invention, which will be described in detail below, deals with how to make a secure and EMV-approved credit card payment using an ordinary unsecure payment device such as a mobile phone without any secure card reader device.

Figure 1:
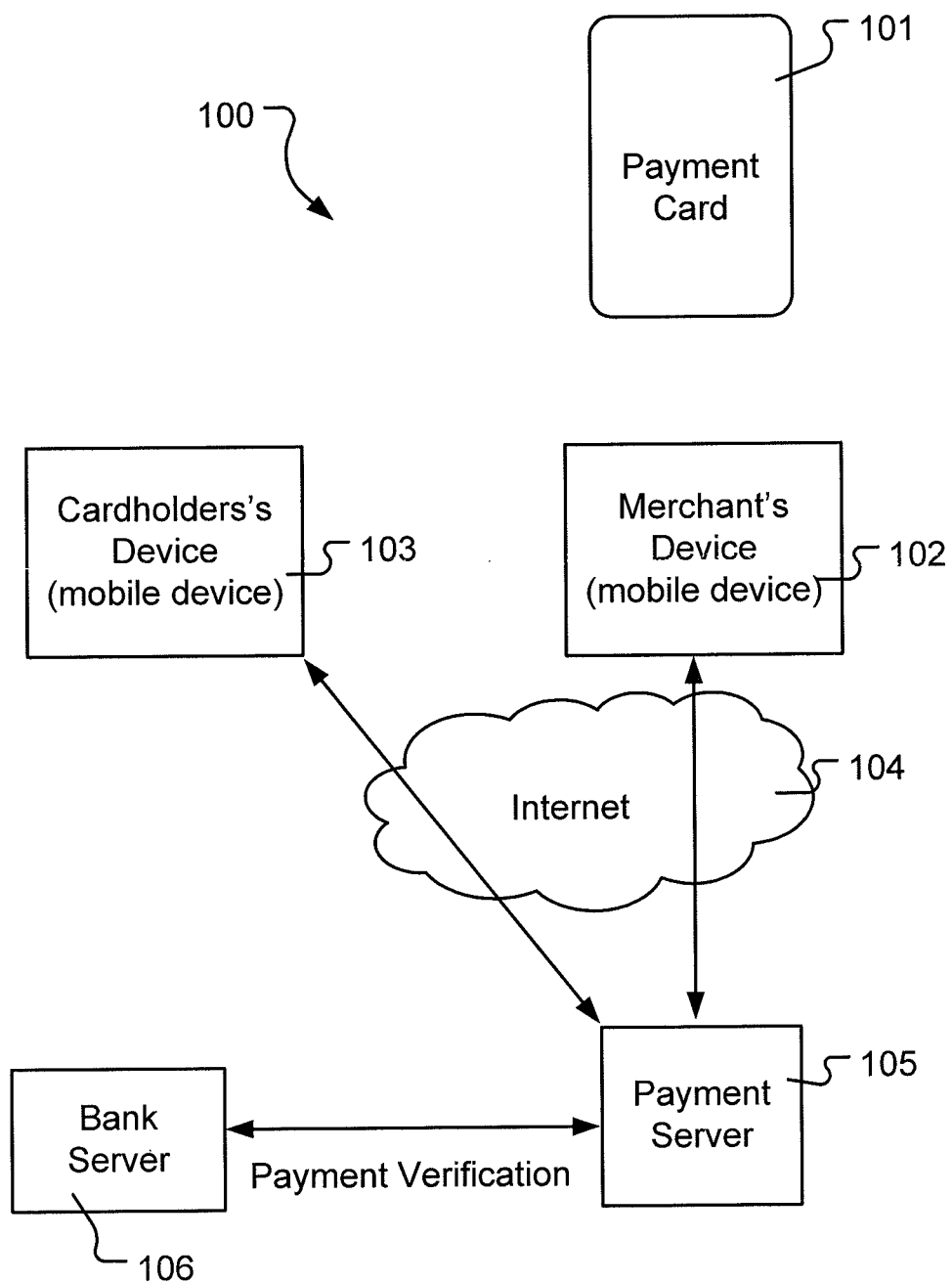
FIG. 1 shows a block diagram of a system for conducting electronic card payments using an ordinary mobile device, according to an embodiment of the present invention.
Figure 2:
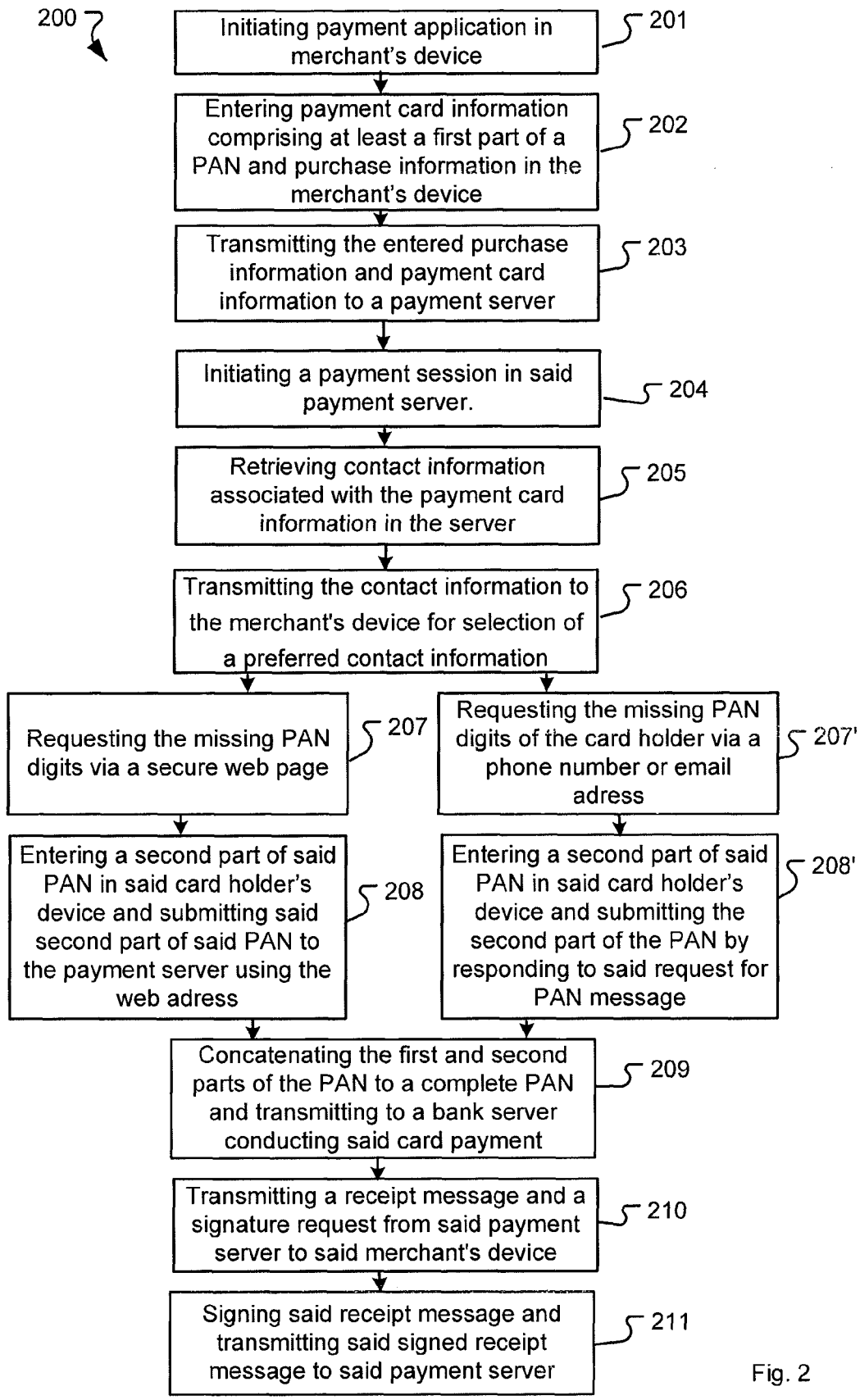
FIG. 2 shows a flow chart describing the steps in a method for conducting an electronic card payment, according to the embodiment of the present invention.

The present invention and embodiments and variants thereof will now be described in detail, referring to the block diagram in FIG. 1 and to the flow chart of FIG. 2. However, to gain a better understanding of how the present invention works it will be described using a typical use-case. The use-case will describe a method and a payment system for conducting an electronic card payment using ordinary mobile devices and without the need for any type of card reader. FIG. 1 shows a block diagram of such an electronic payment system 100 comprising a credit card (hereinafter referred to as a payment card) 101, a merchant's device 102 which may be an ordinary mobile phone, a cardholders' device 103 which also may be an ordinary mobile phone, a bank server 106 and a payment server 105 handling the payment session between the merchant's device, the cardholder's device and the bank server 106.

The cardholder will, when paying for the item or service he or she wishes to purchase, present his or hers payment card 101 to the merchant.

The merchant will initiate a payment application in the merchant's device 102, at step 201. The merchant's device 102 could be any type of electronic device having the capability of running a payment application, and having a user-interface and means for communicating either by wire or wireless with a payment server 105 over a communication network 104 such as the Internet.

The merchant is then prompted by the payment application in the merchant's device 102 to enter purchase information and payment card information. The merchant will manually or automatically enter purchase information and payment card information into the payment application in the merchant's device 102, at step 202. The entered purchase information generally comprise the amount that the cardholder is paying for the item or service, but may also comprise further information about the item (such as a description of the item or service), information about the merchant (such as social security number, etc.), the merchant's business (such as the merchants bank account number, VAT identification number or the like), the geographical position of the merchant's store or the merchant's device.

The entered payment card information generally comprises at least a part of a primary account number (PAN), but may also comprise an expiry date and a card security code (CSC, also known as CVC, CW, CVV2, CVD, etc.).

The PAN is a structured and standardised numbering scheme in accordance with ISO/IEC 7812. The ISO/IEC 7812 number is typically 16 digits in length and it consists of:
 a six-digit Issuer Identification Number (IIN), the first digit of which is the Major Industry Identifier (MII),
 a variable length (up to 12 digits) individual account identifier,
 a single check digit calculated using the Luhn algorithm.

The PAN is either embossed or printed on the payment card in accordance with ISO/IEC 7810 and ISO/IEC 7811.

However, for security reasons the payment application in the merchant's device prompts the merchant to only enter a first part of the payment card's PAN. The first part of the PAN may be any number of digits ranging from at least one PAN digit to at most eighteen PAN digits (if the PAN is comprised of 6+12+1=19 digits according to ISO/IEC 7812) of the PAN number on the payment card used in the payment session. The part of the PAN which the merchant is prompted to enter may vary. In one variant the merchant is prompted to enter the first eight PAN digits and in another variant the merchant is prompted to enter the first six PAN digits. In yet another variant the merchant is prompted to enter the four first PAN digits and the last four PAN digits. Thus, the payment card information will at least comprise a first part of the PAN associated with the payment card used in the payment session.

The entered purchase information and payment card information are transmitted from the merchant's device 102 to a payment server 105 in encrypted form, 203. Encryption algorithm is for instance using an industrial strength Secure Socket Layer (SSL) encryption method, via a wireless or wired link over a network such as the Internet 104, step 203.

When the payment server 105 receives the purchase information and the payment card information, the payment server initiates a payment session and decrypts the received purchase information and payment card information, 204. The received purchase information and payment card information may temporary be stored in the payment server 105 for the duration of the payment session. The payment server 105 will serve as the hub for the on-going payment session, managing the payment session with the merchant's device 102, the bank server 106 and the cardholder's device 103 to complete or reject the payment. The payment can be rejected for several reasons such as that the cardholder has not got enough money on his or hers bank account, any step in the payment session goes wrong, the cardholder or the merchant are band due to misuse of the payment service or due to criminal matters, etc.

The payment session 204 may or may not be limited in time. If the payment session is limited in time, a time-limited payment session is started in the payment server 204. If the payment session is limited in time, all information relating to the ongoing payment session will be deleted for security reasons if the payment session times-out, despite being managed in a secure environment in the payment server 105. A time-out receipt stating that the merchant and the cardholder engaged in a payment that timed-out may optionally be stored in the payment server 105.

In the next step, the payment server 105 compares all or a part of the received and decrypted payment card information with previously stored payment card information in the payment server 105. Each payment card information stored in the payment server 105 is associated with list of contact information compiled by the cardholder (usually during a registration process). The list of contact information comprises at least one way of how the cardholder associated to the payment card from which the payment card information is extracted, can be reached or contacted. The contact information may for instance comprise (at least) one or several of; a phone number, an email address, a Skype identity, Google Talk identity, or any other type of communication address. If the comparison of the received payment card information and the stored payment card information results in a match, the associated list of contact information associated with the matched stored payment card information can be retrieved from the payment server 105. Payment card information and the associated list of contact information may for instance be stored in the payment server 105 during a mandatory registration process that the cardholder has to complete before the cardholder can use the payment card 101 for the first time.

If the comparison results in a match, the retrieved list of contact information (comprising for instance a phone number and an email address) is, in an embodiment of the present invention, transmitted from the payment server 105 to the merchant's mobile device 103. When the merchant receives the list of contact information in the merchant's device 102, the list of contact information (for example the phone number and the email address) is displayed to the merchant. The merchant is then able to select one of the displayed, in the payment application in the merchant's device, contact information from the list of contact information, for example the phone number, preferably in cooperation with the cardholder.

In step 206, the selected contact information is transmitted back to the to the payment server 105 via the payment application in the merchant's device 102. The transmission over the network 104 between the merchant's device and the payment server 105 may or may not be encrypted using SSL technique.

In step 207, a request for PAN message is transmitted to the cardholder's device using the selected contact information. The request for PAN message is displayed in a payment application on a display in the cardholder's device (103). In an embodiment of the present invention, the request for PAN message contains a web address, such as a uniform resource locator (URL), to a secure web page. The request for PAN message containing the URL is displayed to the cardholder in a payment application on a display in the cardholder's device, and the cardholder activates the web address by for instance clicking on it. A secure web page is then accessed on the payment server 105 and securely displayed to the cardholder in the payment application in the cardholder's mobile device. The previously entered (by the merchant) first part of the PAN is presented to the cardholder using the secure web page. The web page may in a variant also contain information about the merchant (i.e. personal name, name of the store, VAT identification number, geographical position, etc.) and the amount to be charged. In step 208, at the secure web page the cardholder is prompted to submit a second part of the PAN in order to complete the PAN and to continue the payment session or the time-limited payment session if one has been started. The missing PAN digits belonging to the second part of the PAN may be indicated to the cardholder along with instructions in the secure web page. The secure web page is preferably hosted on the payment server 105 in a secure, both physically secure and software secure way, environment. The entering of the second part of the PAN may then, computer wise, take place in the secure environment on the payment server 105 in an encrypted state and not in the unsecure environment in the cardholder's device 208, and thus eliminating any eavesdropping applications running in the cardholder's device. The cardholder enters the digits of the second part of the PAN in the secure web page, and thereby submitting the second part of the PAN from the cardholder's device 103 to the payment server 105.

In another embodiment of the present invention, embodied by step 208', the request for PAN message is transmitted from the payment server 105 to the cardholder's device 103 either as a SMS or as an email using the selected contact information (either a phone number or an email address). The request for PAN message is displayed to the cardholder in the cardholder's device requesting the cardholder to submit the second part of the PAN to the payment server 105. The cardholder replies to the request for PAN message by entering the missing PAN digits and submitting it to the payment server 105 either as a return SMS or as a return email depending on how the request for PAN message was received by the cardholder's device. The PAN message is sent to a short message service center (SMSC) if it is a SMS (short message service) or to a mail server if it is an email, in the payment server 105.

In the payment server 105, at step 209, the first and the second part of the PANs are concatenated with each other to form a complete PAN. The stored payment card information in the payment server 105 containing the first part of the PAN is, after the concatenation forming the complete PAN, is updated with the complete PAN, thus forming an updated payment card information.

Also at step 209, the payment server 105 will transmit the updated payment card information (with the complete PAN) and the purchase information to the bank server 106 for conducting the electronic card payment between the merchant and the cardholder. The bank server will, when conducting the electronic card payment perform an on-line verification and a payment transaction (i.e. a disbursement of money from the cardholder's account to the merchant's account). The transmission between the payment server 105 and the bank server 106 may be encrypted with a method that fulfills the requirements of worldwide standards of security of online transfer of payment card details through a secure socket layer.

The bank server 106 receives the encrypted purchase information and the updated payment card information, decrypts the encrypted purchase information and the updated payment card information, verifies the updated payment card information and performs the payment transaction if everything checks out. The bank server 106 completes the on-line verification and payment transaction by transmitting a receipt message from the bank server 106 to the payment server 105. The receipt message may for instance contain an acknowledgement whether the payment amount was successfully charged to the account or not.

The receipt message together with a signature request is transmitted from the payment server 105 to the merchant's device 102 at step 210 and displayed to the merchant in the payment application on the display. The merchant hands the merchant's device 102 to the cardholder whom enter his or hers signature in the payment application, and thus signing the receipt message at step 211. The cardholder enters his or hers signature using the touch screen and a stylus, or any other method, to enter the signature on the merchant's device 102.

Also at step 211, the signed receipt message is transmitted in an encrypted state to the payment server 105 from the merchant's device, where a payment receipt is generated based on said signed receipt message. The payment receipt is stored in the payment server 105. The generation of the payment receipt in the payment server 105 formally ends the time-limited payment session if one has been started. The payment receipt may be transmitted to the merchant's device 102, to the cardholder's device or to both the merchant's device 102 and to the cardholder's device. Since the payment receipt is stored in the payment server 105 it may later be accessed and viewed by the merchant and/or the cardholder.

If any of the steps in the payment session mentioned in above description generates an error, is denied or faulty, an error message is generated and transmitted to the merchant's device 102 and/or the cardholder's device.

In this way a payment session may be completed without the need for a payment card 101 with an EMV-approved chip, a fully secure merchant's device 102, a fully secure cardholder's device 103 or a secure card reader.

It is to be understood that as stated above this is a typical use-case. However one or more of the steps disclosed in FIG. 2 may be omitted. For example, the second part of the PAN may be entered without a preceding request or only one contact information may be sent to the cardholder's device, wherein the selection step 206 is omitted.

By splitting up the PAN into at least two sequences an improved level of security is achieved in comparison to allowing the merchant to enter the complete PAN. In this way the cardholder always have to be an active part of the payment sessions which dramatically improves the security of the payment session. The only other part in the payment session, except for the cardholder, that has access to the complete PAN is the payment server 105. The payment server 105 is easy to keep safe, both physically and software-wise since it is usually placed in a remote secure location and protected by state-of-the-art security software.

Furthermore, the payment method comprising the combination of using a user signature in the merchant's device and PAN input using the cardholder's device, will increase the security further, because this solution requires proximity (i.e. being in the same physical location) between the merchant's device and the cardholder's device since the cardholder is required to enter the second part of the PAN in the cardholder's device and sign the receipt message in the merchant's device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method of conducting an electronic card payment between a merchant, having a merchant's device, and a cardholder, having a payment card and a cardholder's device, comprising:
   initiating a payment application in the merchant's device;
   receiving, into the payment application in the merchant's device from the merchant, purchase information payment and payment card information associated with the payment card, the payment card information comprising at least a first part of a personal account number (PAN) and purchase information;
   receiving, with a payment server, the payment card information entered in the merchant's device from the merchant's device;
   the receiving step triggering the payment server to:
      in the payment sever retrieving, from previously stored payment card information, at least one contact information associated with the received payment card information; and
      transmitting a request for PAN message from the payment server to the cardholder's device, using the contact information;
   receiving, with the payment server and as responsive action to the transmitting, a second part of the PAN from the card holder's device;
   concatenating the first and second parts of the PAN to a complete PAN in the payment server; and
   transmitting the purchase information and the complete PAN to a bank server conducting the card payment.

2. The method according to claim 1, wherein said request for PAN message contains a web address of a secure web page on said payment server and wherein the step of submitting the second part of said PAN comprises submitting said second part of said PAN via said web page.

3. The method according to claim 2 wherein the step of submitting the second part of said PAN comprises submitting said second part of said PAN by responding to the request for PAN message.

4. The method according to claim 1, wherein the contact information is at least one phone number or one email address.

5. The method according to claim 1, further comprising:
selecting in said merchant's device a contact information to use for communication with said cardholder's device and transmitting information about said selection to said payment server and
wherein said request for PAN message is transmitted to said cardholder's device, using said selected contact information.

6. The method according to claim 1 further comprising:
transmitting a receipt message and a signature request from said payment server to said merchant's device; and
transmitting a signed receipt message to said payment server.

7. The method according to claim 1 further comprising the step of:
starting a time-limited payment session in the payment server when said purchase information and payment card information is received from said merchant's device.

8. A system for conducting an electronic card payment between a merchant and a cardholder, the system comprising:

a payment server in operative communication with a merchant's device and a cardholder's device; wherein the payment server executes logical instructions with a processor to:

receive payment card information associated with the payment card, the payment card information comprising at least a first part of a personal account number (PAN), and purchase information, from the merchant's device;

the receipt of the payment card information triggering the execution of logical instructions to:

retrieve, from previously stored payment card information, at least one contact information associated with the received payment card information; and transmit a request for PAN message from the payment server to the cardholder's device, using the contact information;

receive, as responsive action to the transmission of the request, a second part of the PAN from the card holder's device;

concatenate the first and second parts of the PAN to a complete PAN in the payment server; and transmit the purchase information and the complete PAN to a bank server conducting the card payment.

* * * * *